JOHNSON ORR AND HENRY H. MARTIN, OF OXFORD, OHIO.

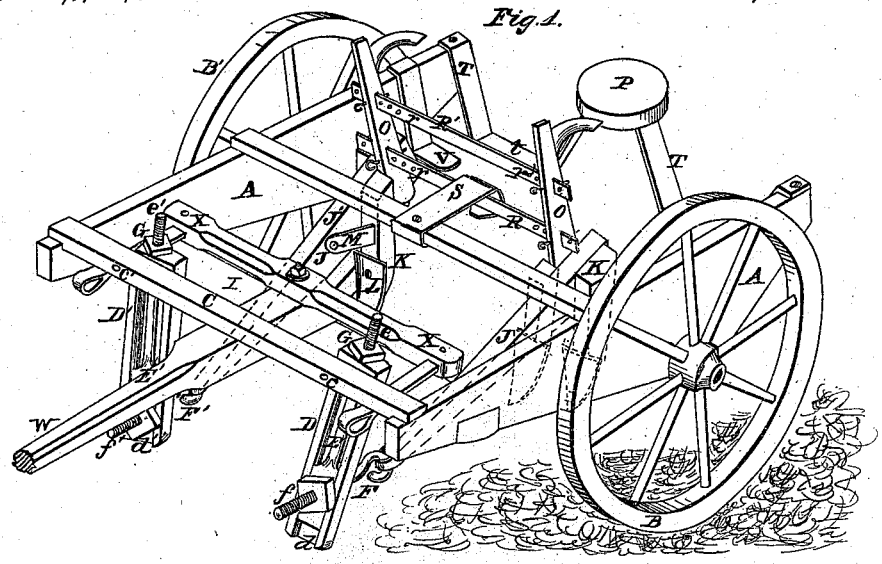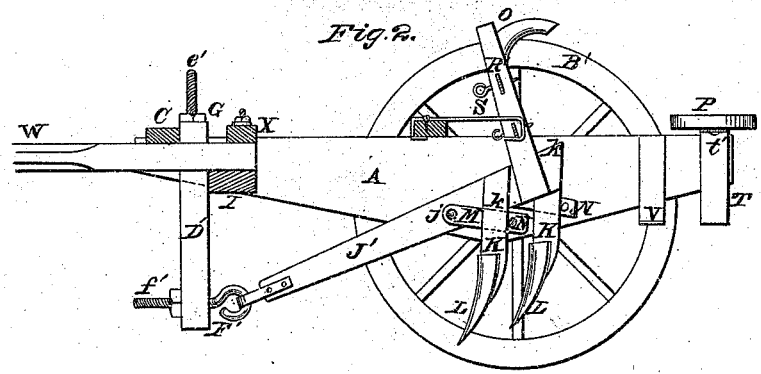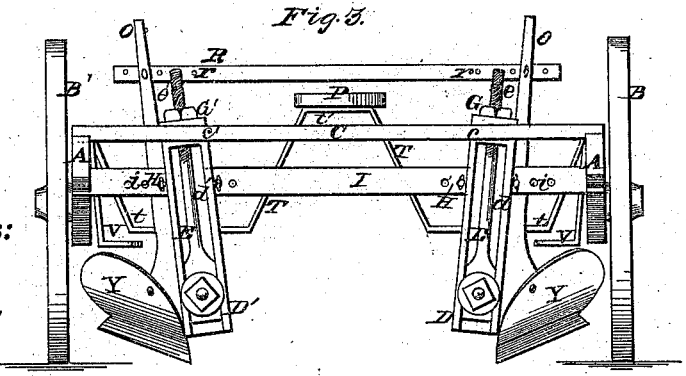

Letters Patent No. 83,404, dated October 27, 1868.

IMPROVEMENT IN CONVERTIBLE PLOW AND CULTIVATOR.

The Schedule referred to in these Letters Patent and making part of the same.

*To whom it may concern:*

Be it known that we, JOHNSON ORR and HENRY H. MARTIN, both of Oxford, Butler county, Ohio, have invented a new and useful Cultivator; and we do hereby declare the following to be a full, clear, and exact description thereof, reference being had to the accompanying drawings, making part of this specification.

This invention relates to that class of agricultural implements commonly known as cultivators, and The first part of our improvement consists in an arrangement of devices, whereby the machine is rendered flexible, so as to permit of the operating-parts being turned to the right or left, or of being elevated, for the purpose of evading stones, stumps, and other obstructions.

The second part of our improvement consists in the provision of a peculiarly-constructed brace at the rear end of the implement, which brace not only stiffens the main frame of the cultivator, but also serves as a step and foot-rest for the driver, and as a support for the driver's seat.

In the accompanying drawings,

Figure 1 is a perspective view of a cultivator, provided with our improvements.

Figure 2 is a longitudinal section of the implement.

Figure 3 is a front elevation of the same.

A represents the main frame of the cultivator. This frame is supported upon customary ground-wheels, B B', and has attached to its front end a beam, C, to which there is pivoted at c c, a couple of swinging hangers, D D', the latter being grooved at d d', for the reception of bars, E E'. The bars E E' are pierced at their lower ends for the reception of the screw-threaded shanks f f', of the ring-bolts F F', and said bars are capable of being adjusted vertically by means of the screw-threaded portions e e' and nuts G G'.

The swinging hangers D D' may be adjusted laterally in either direction by means of the pins H, which are inserted in the apertures i of the fixed beam I.

Connected to the ring-bolts F F' are the plow-beams J J, having sheths, K, which are armed with shares, L. The sheths are not attached rigidly to the plow-beams, but are pivoted thereto at k, and are maintained in their proper position by ties, M. These ties are bolted to the plow-beams at j, and pass through the sheths, immediately above the shares.

N are wooden pins, which are passed through the ties in the rear of the sheths, and are sufficiently stout to resist any customary strain, but will break as soon as the shares come in contact with any obstruction that would injure them.

Attached to the rear ends of the plow-beams are handles, O, which are controlled by the driver, who sits upon the seat P.

These handles are connected together by braces, R R', having perforations, r, which permit of said handles being adjusted toward or from each other, as may be desired.

The plow-beams can be elevated and maintained in position by causing either of the braces R R' to be engaged under the hooked catch S.

Uniting the rear ends of the frames A is a brace, T, whose depressed portions, t, serve as steps to facilitate the driver's access to the seat P, and thereby enables the driver to maintain his position in perfect comfort, and without any danger of being jolted off.

Attached to the inside of the frames A are steps, V, which serve to support the driver's feet when he is seated upon the machine.

Our cultivator is provided with a customary pole or tongue, W, and double-tree, X.

In the drawings, the implement is shown as being furnished with shovel-plows, but it is evident that the ordinary turning-shares may be attached to the plow-beams, as shown at Y, in fig. 3, and said shares can be applied in such a manner as to throw the soil either toward or from the crop.

This implement can be adjusted in a few minutes, so as to cultivate corn or other crops, either in wide or narrow rows, and the simplicity of its construction renders it of easy operation by any one.

We claim herein as new, and of our invention,

1. The combination and arrangement, substantially as described, of the frame A C, c c', swinging hangers D d and D' d', adjustable bars E e and E' e', nuts G G', ring-bolts F f and F' f', pins H, apertures i, plow-beams J J', pivoted sheths K k, ties M, pins N, handles O, braces R r and R' r', and catch S, for the object stated.

2. The construction of the brace T, with depressed portions, t t, to serve as steps, and an elevated central portion, t', to which the seat P is attached, all as herein described.

In testimony of which invention, we hereunto set our hands.

JOHNSON ORR.
HENRY H. MARTIN.

Witnesses:
GEO. H. KNIGHT,
JAMES H. LAYMAN.